(12) United States Patent
Nishimoto et al.

(10) Patent No.: US 7,285,175 B2
(45) Date of Patent: Oct. 23, 2007

(54) ADHESIVE SHEET STAMPING DEVICE, ADHESIVE SHEET STAMPING METHOD

(75) Inventors: Tomotaka Nishimoto, Hirakata (JP); Shinjiro Tsuji, Nara (JP); Ryouichirou Katano, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 47 days.

(21) Appl. No.: 10/486,147

(22) PCT Filed: Jan. 14, 2003

(86) PCT No.: PCT/JP03/00188

§ 371 (c)(1),
(2), (4) Date: Feb. 6, 2004

(87) PCT Pub. No.: WO03/060988

PCT Pub. Date: Jul. 24, 2003

(65) Prior Publication Data

US 2005/0260341 A1    Nov. 24, 2005

(51) Int. Cl.
*B32B 41/00* (2006.01)

(52) U.S. Cl. .......... 156/64; 156/356; 156/357; 156/353

(58) Field of Classification Search ........... 156/64, 156/350, 352, 353, 356, 357, 367, 368, 378, 156/510, 538, 539, 540
See application file for complete search history.

(56) References Cited

U.S. PATENT DOCUMENTS

| | | | |
|---|---|---|---|
| 5,437,749 A * | 8/1995 | Pipkorn et al. | 156/64 |
| 5,766,402 A | 6/1998 | Muraoka et al. | |
| 6,520,080 B1 * | 2/2003 | Fried | 101/227 |
| 6,725,625 B1 | 4/2004 | Honma et al. | |
| 6,868,883 B2 * | 3/2005 | Benedetti | 156/353 |

FOREIGN PATENT DOCUMENTS

| | | |
|---|---|---|
| JP | 7-270742 | 10/1995 |
| JP | 10-173321 | 6/1998 |
| JP | 2000-357859 | 12/2000 |
| JP | 2003-12222 | 1/2003 |
| JP | 2003-103499 | 4/2003 |
| KR | 2001-0012075 | 2/2001 |
| KR | 10-0293893 | 11/2001 |
| WO | WO96/10838 | 4/1996 |
| WO | WO96/11494 | 4/1996 |

\* cited by examiner

*Primary Examiner*—George Koch
(74) *Attorney, Agent, or Firm*—Hamre, Schumann, Mueller & Larson, P.C.

(57) ABSTRACT

An adhesive sheet attaching device is provided with: a stage (6); a feeder (10) for feeding adhesive sheet (8) onto the stage (6); a cutter (16); a pressurizer (7) for attaching the adhesive sheet (8) to a target object mounted on the stage (6); a detector (11) for detecting a connecting portion (18); and a controller. When the detector (11) detects the connecting portion (18), the controller stops the operation of the feeder (10) after adhesive sheet (8) of an attachable length up to the connecting portion (18) has been attached. This makes it possible to reliably prevent adhesive sheet (8) containing a connecting portion (18) from being attached to a target object, and to effectively use the adhesive sheet up to the connecting portion (18), thus making it possible to suppress resource loss.

5 Claims, 12 Drawing Sheets

ADHESIVE SHEET STAMPING DEVICE, ADHESIVE SHEET STAMPING METHOD

This application is a 371 of PCT/JP03/00188, filed on Jan. 14, 2003.

TECHNICAL FIELD

The present invention relates to adhesive sheet attaching devices, adhesive sheet attaching methods, and component mounting devices, and to display panel production methods that use these, in which an adhesive sheet for fixing a mounted component is attached to a display panel such as a liquid crystal panel.

BACKGROUND ART

Conventionally, component mounting devices are known in which an adhesive sheet for fixing a mounted component is attached to a display panel such as a liquid crystal panel, and the mounted component is pressed onto the adhesive sheet. For example, there are electronic component mounting devices in which, after attaching ACF (anisotropic conductive film) with attached release sheet to a liquid crystal panel, and then peeling off the ACF's release sheet, a TCP (thin LSI-chip package) is pressed onto the ACF, and the TCP is mounted onto the liquid crystal panel.

FIG. 12 shows process drawings of a conventional ACF attaching device. A head 101 is arranged facing a stage 100. The head 101 is provided with a pressure applying surface 101a. A reel 104 is arranged on the supply side of an ACF 102. The ACF 102 with attached release sheet is wound around the reel 104. The ACF 102 is supplied onto the stage 100 via supply rollers 105a to 105d.

FIG. 12A shows the initial state of an ACF attaching operation. The leading edge of the ACF 102 is positioned at a cutter 108. In the step of FIG. 12B, a predetermined length of the ACF 102 is drawn out onto the stage 100 by a feed chuck 107. The drawing out of the film is performed by the feed chuck 107 moving in the direction of arrow a with a chuck portion of the feed chuck 107 clamping the release sheet 103.

As can be seen in FIG. 12B, with the ACF 102 drawn out by a predetermined length required for a single attachment (hereafter, "single attachment unit"), the ACF 102 is cut by the cutter 108, leaving the release sheet 103 intact. After cutting, the cutter 108 withdraws from above the stage 100. In this condition, a substrate is supplied onto the stage.

FIG. 12C shows a single attachment unit of the ACF 102 being pressed onto a substrate 110 by the head 101. Here, the pressure applying surface 101a is heated to a predetermined temperature, and presses the substrate 110 with the ACF 102 inbetween. The ACF 102 is attached to the substrate 110, and the head 101 moves up.

After this, while a sheet lock 109 clamps and holds the release sheet 103, and while the feed chuck 107 is open, the feed chuck 107 is moved toward the supply side of the ACF 102, and peeled off from the ACF 102 that is attached to the substrate 110. After this peeling off, successive single attachment units of ACF 102 are attached to the remaining attachment locations on the substrate 110 by repeating the steps shown in FIGS. 12B and 12C. When all ACF attachments for the substrate 110 are complete, the substrate 110 is transported to the next process.

Here, ACF 102 is wound onto the reel 104, but in order to supply as much ACF as possible with a single reel, sometimes a reel is used wound with ACF that is made of multiple continuous connected ACFs. When such a reel is used, a joint is formed at the connecting portion between the ACFs, but because the length of ACF wound around the single reel becomes longer, the number of reel replacements can be reduced.

Furthermore, whether using a reel on which multiple continuous ACFs are not connected, or whether using a reel on which multiple continuous ACFs are connected by a joint, in either case an end mark is formed on the end position of the ACF on the single reel, and it can be confirmed that the ACF on the reel has run out when this end mark appears.

However, conventional ACF attaching devices such as those described above have the following problems. When using a reel wound with joined ACF, a portion containing a joint cannot be used for attachment to a substrate. For this reason, when a joint appears, it is necessary to stop production temporarily, and peel off the portion containing a joint.

If production is set up for the joint to appear when production is finished, reductions in the operation ratio can be suppressed by using the periods in which the equipment is not operative, peeling off the portion containing a joint, and setting the equipment to an initial state as in FIG. 12A. However, the time when the joint appears varies depending on the length of attachments, and the type of reel, and in most cases it is impossible to ensure that the joint appears at the end of production. For this reason, it is necessary to stop the ACF attaching device temporarily during production when a joint appears.

In this case, the ACF containing a joint is peeled off from the release sheet, and in many cases an attachment length longer than a single attachment unit remains in this peeled off portion, so that there are many cases of wastefully peeling off more film than necessary and not making use of and attaching to a substrate the usable limit of ACF up to the joint. Thus there is the problem of resource loss.

Furthermore, there is also the problem that, after the joint appears, the successive operation of peeling off the joined portion of ACF is a manual task, and therefore takes time in preparation.

Furthermore, when the ACF is provided with an end mark, the usable limit of ACF up to the end mark is not made use of and attached to a substrate when the end mark is recognized. Thus there is the problem of wasting resources.

DISCLOSURE OF INVENTION

The present invention was conceived to solve the problems described above, and it is an object thereof to provide an adhesive sheet attaching device, a component mounting device, and a display panel production method that use these, which can improve productivity and reduce resource losses.

In order to achieve this object, an adhesive sheet attaching device of the present invention attaches an adhesive sheet with an attached release sheet supplied continuously in a longitudinal direction to a target object, and discharges a release sheet peeled off from the adhesive sheet, wherein the adhesive sheet is provided with at least one of a connecting portion in which ends of adhesive sheets that are continuous in the longitudinal direction are joined, and an end portion that indicates an end position of the supply in the longitudinal direction, wherein the adhesive sheet attaching device comprises:

a feeder for moving while holding a release sheet peeled off from the adhesive sheet, and feeding the adhesive sheet onto the target object;

a cutter for cutting a length of the fed adhesive sheet that is required for attachment;

an attacher for attaching the cut adhesive sheet to the target object;

a detector for detecting the connecting portion or the end portion; and a controller for controlling at least an operation of the feeder, the cutter, and the attacher; and wherein the controller, when the detector detects the connecting portion or the end portion, stops the operation of the feeder and the attacher after an adhesive sheet of an attachable length up to the connecting portion or the end portion has been attached.

Next, a component mounting device of the present invention uses an adhesive sheet attaching device of according to the present invention, and fixes a mounted component to the adhesive sheet that has been attached to the target object by the adhesive sheet attaching device. By using such a component mounting device with the above-mentioned adhesive sheet attaching device, outstanding productivity can be achieved, and resource losses can be reduced.

Furthermore, a display panel production method of the present invention that uses an adhesive sheet attaching device according to the present invention is a display panel production method wherein the target object is a display panel, and the adhesive sheet is an anisotropic conductive film.

Next, an adhesive sheet attaching method of the present invention that attaches adhesive sheet with an attached release sheet supplied continuously in a longitudinal direction to a target object, and discharges a release sheet peeled off from the adhesive sheet, includes:

supplying, as the adhesive sheet, an adhesive sheet that is provided with at least one of a connecting portion in which ends of adhesive sheets that are continuous in the longitudinal direction are joined, and an end portion that indicates an end position of the supply in longitudinal direction;

feeding the adhesive sheet by holding the release sheet peeled off from the adhesive sheet and moving it with a feeder;

cutting a length of the fed adhesive sheet that is necessary for attachment with a cutter, and attaching the cut adhesive sheet to the target object with an attacher; and when the connecting portion or the end portion is detected by a detector, stopping the operation of the feeder and the attacher after an adhesive sheet of an attachable length up to the connecting portion or the end portion has been attached.

BEST MODE FOR CARRYING OUT THE INVENTION

Figure 1:
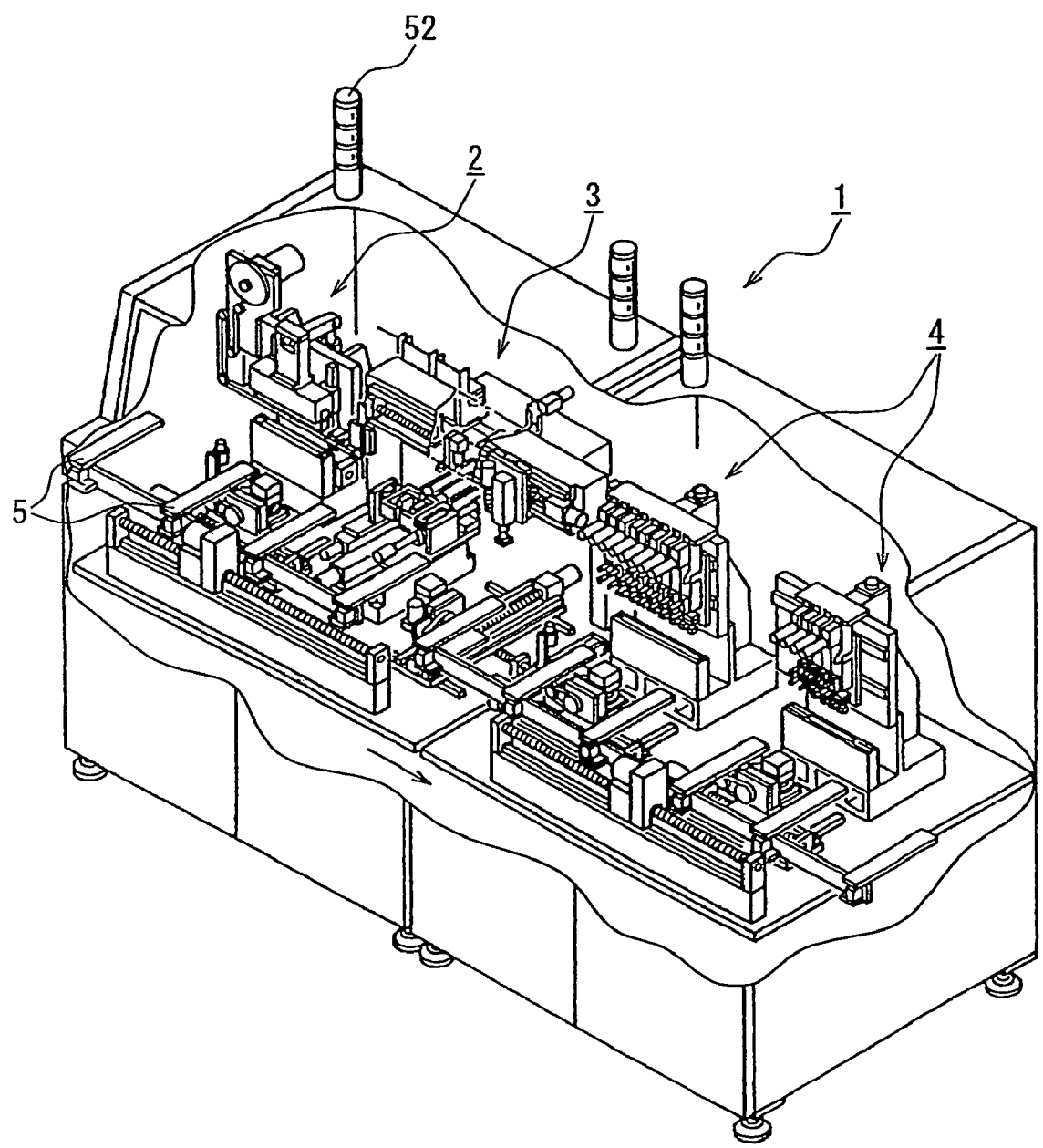
FIG. 1 is an oblique view of a component mounting device according to an embodiment of the present invention.

An adhesive sheet attaching device of the present invention is provided with a joint detector, and therefore the detector detects the joint and reliably stops the movement of the feeder, regardless of the length of a single piece of adhesive sheet, or the type of reel. For this reason, attaching an adhesive sheet that contains a joint to a target object can be reliably prevented. Further still, the adhesive sheet can be used effectively up to the joint, thus making it possible to suppress resource loss.

In the adhesive sheet attaching device of the present invention, it is preferable that the controller, when the detector detects the connecting portion or the end portion, judges whether or not a length required for a single attachment to the target object is ensured in the adhesive sheet between the end face on the discharge side of the release sheet and the connecting portion or the end portion, when it is judged that such a length is ensured, operation of the feeder and the attacher is continued until the single attachment length of adhesive sheet is attached to the target object, and when it is judged that such a length is not ensured, the movement of the feeder is stopped.

Furthermore, it is preferable when there are two or more attachment locations of the adhesive sheet to the target object, that, when the detector detects the connecting portion or the end portion, the controller judges whether or not a length required for a single set of attachments to the target object is ensured in the adhesive sheet between the end face on the discharge side of the release sheet and the connecting portion or the end portion, when it is judged that such a length is ensured, operation of the feeder and the attacher is continued until the single set of adhesive sheet is attached to all the attachment locations of the target object, and when it is judged that such a length is not ensured, the movement of the feeder is stopped. With such an adhesive sheet attaching device it is possible to prevent deterioration of the adhesive sheet's adhesive caused by leaving the target object during attachment to the target object. Furthermore, as no substrate remains in the adhesive sheet attaching device, manual tasks after the device stops become easier, and operability is improved.

Furthermore, it is preferable that when the detector detects the connecting portion, and after adhesive sheet of an attachable length up to the connecting portion is attached, the controller causes the feeder to move until a position of the connecting portion is on the discharge side of the release sheet with respect to a cutting position of the cutter, and the adhesive sheet is cut by the cutter. With such an adhesive sheet attaching device the task of skipping the joint is automated, and therefore it is possible to reduce the manual tasks involved in setting up an initial state.

Furthermore, it is preferable that a stage is provided onto which the target object is mounted, and that the attacher is provided with a press that presses the target object mounted on the stage with the adhesive sheet fed onto the target object in between.

Furthermore, it is preferable that a discarding stage is further provided that is capable of moving over the stage and withdrawing from the stage,
and wherein, the controller, after causing the feeder to move until a position of the connecting portion is on the discharge side of the release sheet with respect to a cutting position of the cutter,
causes the adhesive sheet to be cut by the cutter, the discarding stage to move over the stage, and the adhesive sheet to be attached to the discarding stage by the press. With such an adhesive sheet attaching device, after detection of a joint, manual tasks performed until the setup of an initial state are eliminated, thus improving the operating ratio.

Furthermore, it is preferable that a release sheet is attached to the discarding stage, and the adhesive sheet is attached to the release sheet. With such an adhesive sheet attaching device, the task of peeling off the adhesive sheet from the discarding stage becomes easier.

Furthermore, it is preferable that a notification means is provided for notifying when a predetermined number of sheets of the adhesive sheet is attached to the discarding stage. With such an adhesive sheet attaching device it is possible to prevent leaving the equipment with adhesive sheet not peeled off from the discarding stage.

Furthermore, it is preferable that the discarding stage is attached to a supporter that is rotatable by a movement enabling means, and can be moved over the stage and withdrawn from the stage with the rotation of the supporter. With such an adhesive sheet attaching device it is possible to reliably mount the discarding stage over the stage with a simple construction.

Furthermore, a component mounting device of the present invention that uses an adhesive sheet attaching device of the present invention can achieve outstanding productivity and reduce resource losses.

Furthermore, a display panel production method of the present invention that uses an adhesive sheet attaching device of the present invention can achieve outstanding productivity and reduce resource losses.

An adhesive sheet attaching method of the present invention is provided with a joint detector, and therefore the detector detects the joint and reliably stops the movement of the feeder, regardless of the length of a single piece of adhesive sheet, or the type of reel. For this reason, attaching an adhesive sheet that contains a joint to a target object can be prevented reliably. Further still, the adhesive sheet can be used effectively up to the joint, thus making it possible to suppress resource loss.

The following is a description of preferred embodiments of the present invention with reference to the accompanying drawings. The adhesive sheet attaching device in the following embodiments is an example of an ACF attaching device.

EMBODIMENT 1

FIG. 1 is an oblique view of a component mounting device according to an embodiment of the present invention. The component mounting device 1 shown in this figure is a device that attaches ACF to a liquid crystal panel, which is the target object for attachment, and mounts a TCP, which is the mounted component. The component mounting device 1 includes an ACF attaching device 2. The ACF attaching device 2 attaches ACF to the liquid crystal panel, and peels off the ACF's release sheet. Then, the mounted component TCP is pre-pressured to the liquid crystal panel by a TCP pre-pressure portion 3, and the TCP is mounted onto the liquid crystal panel by a TCP actual-pressure portion 4.

Transport arms 5 are provided to transport the liquid crystal panel. A liquid crystal panel brought in from outside the device on the transport arms 5 is transported in the direction of the arrow while being passed to the next adjacent transport arms 5 when the operation in each of the portions 2 to 4 is finished.

Figure 2:
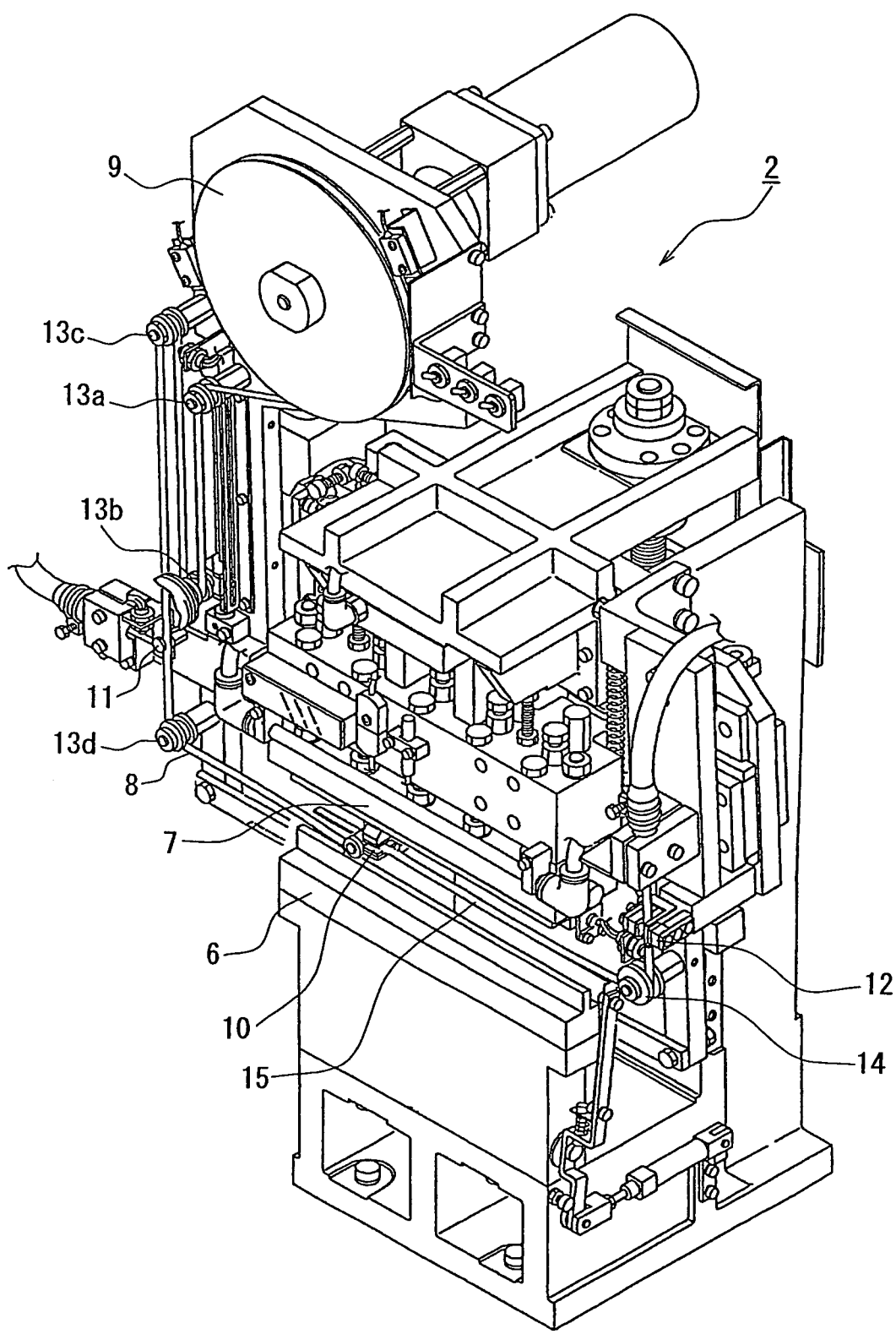
FIG. 2 is an oblique view of an ACF attaching device according to an embodiment of the present invention.

FIG. 2 shows an enlarged oblique view of the ACF attaching device 2 shown in FIG. 1. A head 7 serving as a press is arranged facing a stage 6 serving as a base. A liquid crystal panel is placed on the stage 6 as a target object for attachment. A reel 9 is arranged on the supply side of the ACF 8. ACF with attached release sheet is wound onto the reel 9.

Figure 3A:
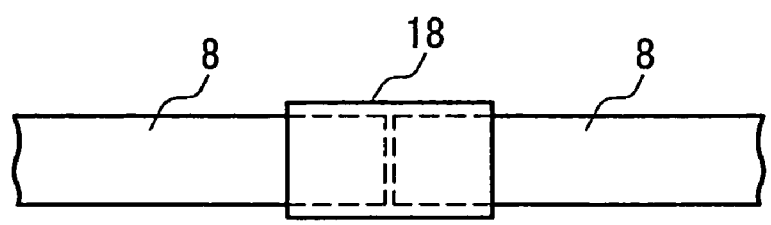
FIG. 3 is a cross-section of the main parts of an ACF used in embodiments of the present invention.

In this embodiment, the ACF wound onto the reel 9 is a continuous film of at least two pieces of ACF connected end to end. FIG. 3 shows top views of the essential parts of the ACF used in this embodiment. As shown in FIG. 3A, a joint 18 is formed as a connecting portion on ACFs 8. As shown in this drawing, the joint 18 connects the end portions of the ACFs 8 like tape. The joint 18 is detected by a joint sensor 11, which is a detector.

Figure 3B:
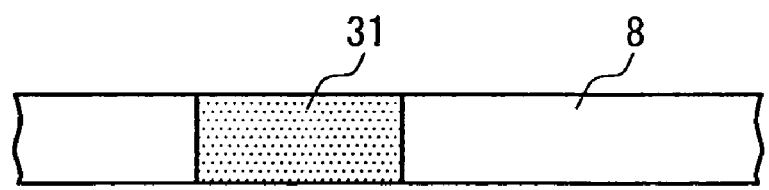

Furthermore, as shown in FIG. 3B, an end mark 31, which is an end portion, is formed on the ACF 8. The end mark 31 shows the usage limit of the ACF 8 on the reel 9, that is a reference point for the end position. The end mark 31 is provided as a red or other color mark on the ACF 8, and can be recognized visually. The end mark 31 is detected by an end sensor, which is a detector. In this embodiment, the joint sensor 11 also functions as an end sensor, and can detect both the joint 18 and the end mark 31. However, the present invention is not limited to this configuration, and a joint sensor and an end sensor may be provided individually.

The ACF 8 is cut at a predetermined length by a cutter that is a cutting means. In this drawing, the cutter is withdrawn to the deep end of the head 7. The ACF 8 is fed from the reel 9 by the movement of a feed chuck 10, which is a feeder that clamps a release sheet 15. In the following, this operation is referred to as "feeding."

The ACF 8 is supplied onto a stage 7 via supply rollers 13a to 13d. Furthermore, when the attachment of the ACF 8 is finished, the release sheet 15 that is peeled off the ACF 8 is discharged via a discharge roller 14.

A control unit is provided in this embodiment, and this control unit controls the operations of the feed chuck 10, the cutter, and the head 7. Furthermore, a detection signal of the joint sensor 11 is also input to the control unit.

The following is an explanation of an ACF attaching device according to an embodiment of the present invention with reference to the process drawings of FIGS. 4 to 6. Each figure shows a simplified version of the ACF attaching device 2 shown in FIG. 2.

Figure 4A:
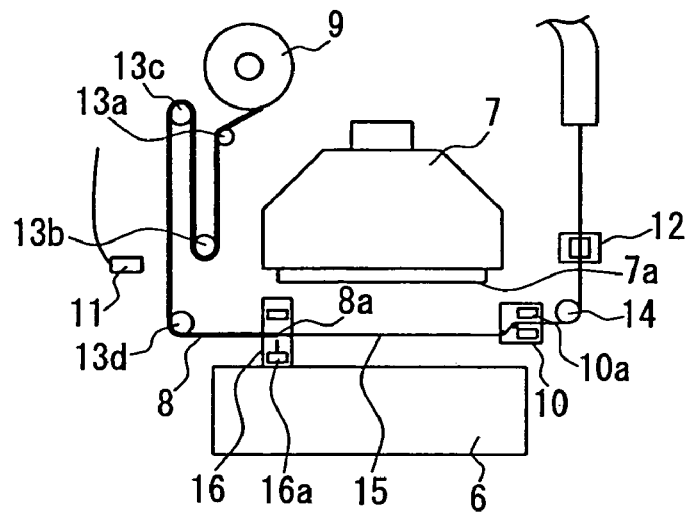
FIG. 4 is a process drawing of an ACF attaching device according to Embodiment 1 of the present invention.
Figure 4B:
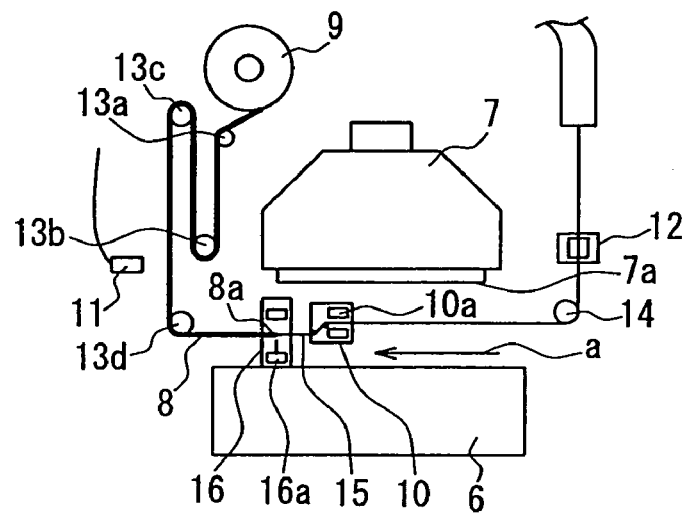

FIG. 4A shows an initial state of an ACF attaching operation. A leading edge 8a of the ACF is positioned at a cutter 16. In the step of FIG. 4B, a feed chuck 10 is moving in the direction of arrow a (toward the supply side of the ACF 8). A chuck portion 10a, which is a holding means of the feed chuck 10, is in an open state during this movement. In FIG. 4B, the feed chuck 10 is shown in a state in which its movement is completed. After this, the feed chuck 10 closes the chuck portion 10a, and the chuck portion 10a clamps and holds a release sheet 15.

Figure 4C:
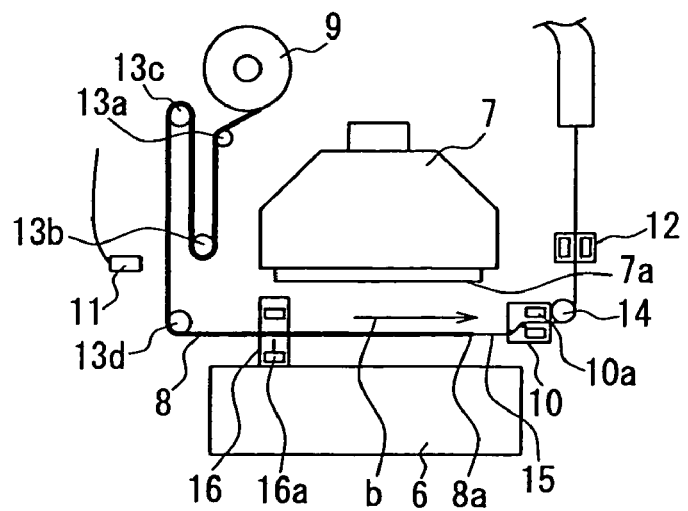

In FIG. 4C, the feed chuck 10 that holds the release sheet 15 moves in the direction of arrow b (toward the discharge side of the release sheet 15), and a predetermined length of the ACF 8 required for a single attachment (hereafter, "single attachment unit") is shown in a state in which it has been fed onto a stage 6.

Figure 5D:
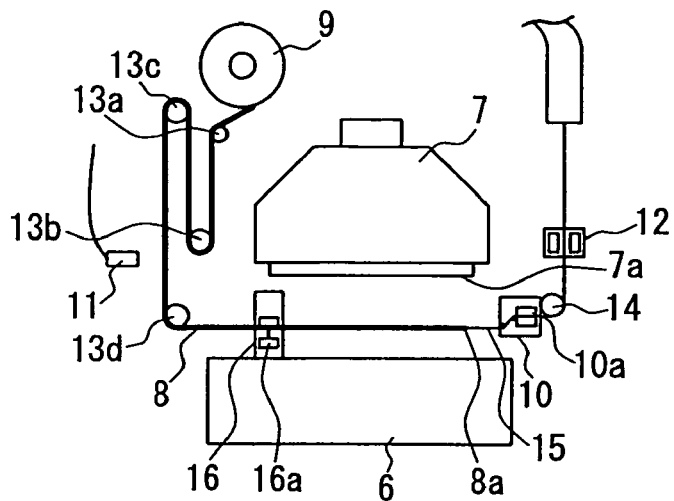
FIG. 5 is a process drawing of an ACF attaching device according to Embodiment 1 of the present invention.

FIG. 5D shows a step of cutting the ACF 8. A cutting mechanism 16a of the cutter 16 clamps the ACF 8, and a blade tip of the cutting mechanism 16a cuts into the ACF 8 in the direction of the ACF's thickness, and the ACF 8 is cut. This cutting is set up so that only the ACF 8 is cut, and the release sheet 15 is left without being cut. After the ACF 8 is cut, the cutter 16 is withdrawn to a position in which it does not interfere with the head 7.

Figure 5E:
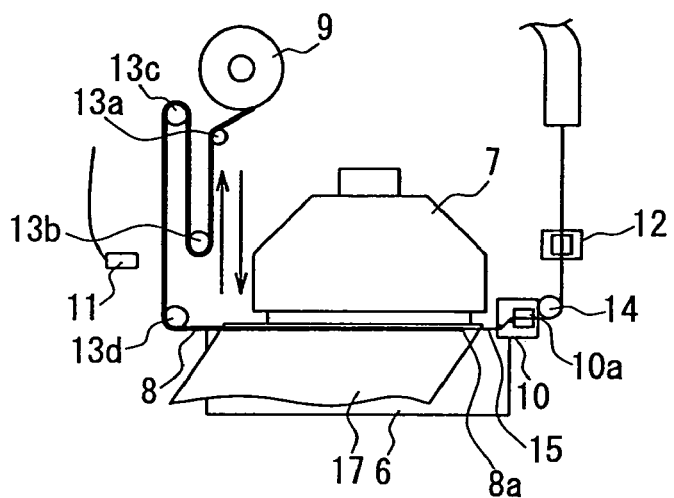

FIG. 5E shows a step of applying pressure. After the cutter 16 is withdrawn, a substrate 17 is transported onto the stage 6. In FIG. 5E, a pressure applying surface 7a of the head 7 is heated to a predetermined temperature, then presses the substrate 17 with the ACF 8 inbetween, and a single attachment unit of the ACF 8 is attached to the substrate 17.

Figure 5F:
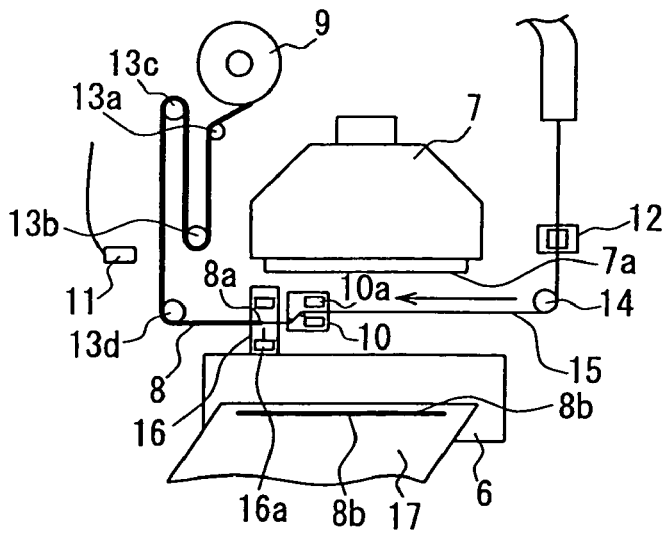

As shown in FIG. 5F, after the ACF 8 is attached, the head 7 moves up (moves in a direction away from the stage 7). After this, while a sheet lock 12, which is a holding means, clamps and holds the release sheet 15, the feed chuck 10 opens and moves to the supply side of the ACF 8, and the release sheet 15 is peeled off from the ACF 8 that is attached to the substrate 17. This peeling off completes the attachment of a single attachment unit of the ACF 8b to the substrate 17. After this, the substrate 17 is transported to the next process. Next, the process returns to the feeding of feed chuck 10 to attach the next single attachment unit of ACF shown in FIG. 4C, and the above-described steps are repeated, with an ACF 8 attached to each of the substrates 17 that are successively transported onto the stage 6.

Figure 7:
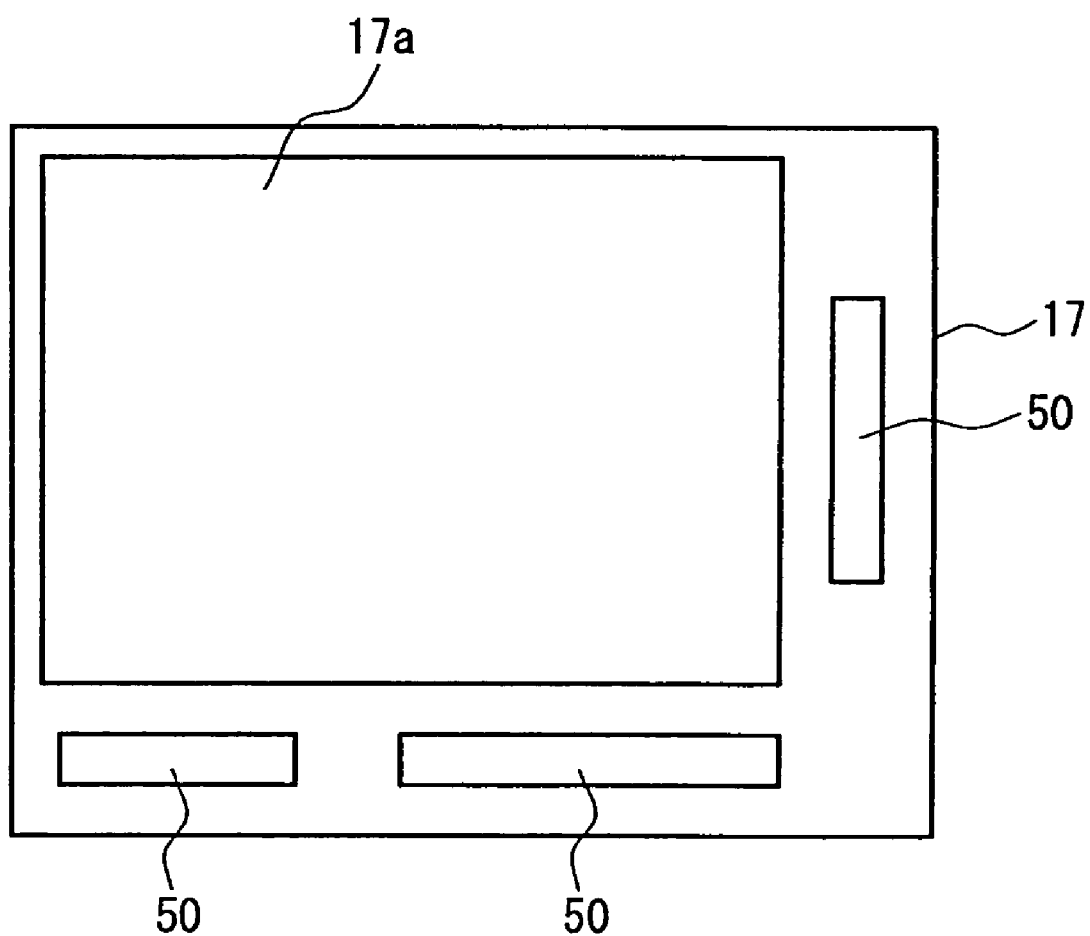
FIG. 7 is a top view of an example substrate with multiple attachment locations of ACF.

It should be noted that the explanation of this embodiment uses an example in which the ACF 8 is attached at one location to a single substrate 17, but the ACF 8 may be attached to a plurality of locations on a single substrate 17 as shown in FIG. 7. When this is the case, the size of the pressure applying surface 7a of the head 7 becomes approximate to a size capable of applying pressure to each single attachment unit of the ACF 8, and when each attachment of a single attachment unit of the ACF 8 is complete, the position of the substrate is shifted or rotated, and a transition is made to the step of attaching the next single attachment unit of the ACF 8.

Figure 6G:
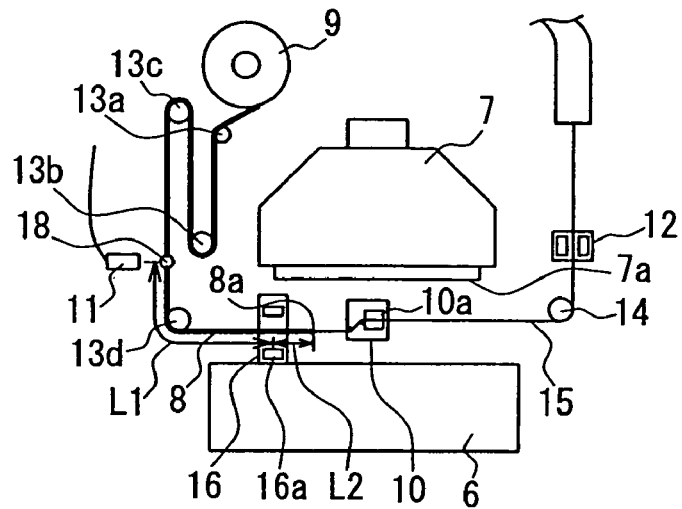
FIG. 6 is a process drawing of an ACF attaching device according to Embodiment 2 of the present invention.

The reel 9 used here in this embodiment is wound with joined ACF, so that a joint appears from the reel 9 during the repeated feedings of the feed chuck 10. FIG. 6G shows a state in which, during a movement of the feed chuck 10, the joint 18 has reached the position where the joint sensor 11 is arranged. In this state, the joint sensor 11 detects the joint 18.

In this embodiment, even after the joint 18 is detected, attachment operations continue to use the ACF 8 available up to the usable limit up to the joint 18.

In this embodiment, a length L1 from the cutting position of the cutter 16 to the joint sensor 11 is stored in the control unit. Furthermore, in this embodiment, it is assumed that the sheet length of each single attachment unit of the ACF 8 that is attached to the substrates varies each time. However, the length of each attachment may of course also be the same. When the joint sensor 11 detects the joint 18, the control unit calculates whether there is enough of the ACF 8 remaining between the end face on the discharge side of the release sheet 15 and the joint 18 for the next single attachment unit.

This calculation is made possible by inputting in advance the attachment lengths for each attachment portion of sheeting to be attached to the substrates. Here the length of the next single attachment unit is L, and the ACF 8 has been already fed by a length L2 from the cutting position, and therefore if a length (L−L2) is fed, then the length L for the next single attachment unit will be fed.

In this case, whether or not there is enough length remaining in the length L1 for the length (L−L2) is judged by whether or not the following equation (1) is satisfied. If the equation (1) is satisfied, then the length L of the next single attachment unit is ensured, and therefore the control unit judges that it is possible to attach a sheet of the next single attachment unit, and the process proceeds to the attachment of the next single attachment unit. If the equation (1) is not satisfied, then the length L for the attachment sheet of the next single attachment unit is not ensured, and therefore the control unit judges that it is not possible to attach a sheet of the next single attachment unit, and the operation of the device is stopped.

It should be noted that the length L2 can be calculated by the control unit based on the number of drive motor pulses in the period from the start of movement of the feed chuck 10 until the stopping of movement.

$$L1-(L-L2) \geq 0 \quad \text{Equation (1)}$$

If the equation (1) is satisfied, a sheet attachment of the next single attachment unit is performed, but when the length of the remaining ACF 8 excluding the length of the sheet attachment of this single attachment unit (the length from the cutting position of the cutter 16 up to the joint 18) is L3, then the control unit stores L3=L1−(L−L2). Using this L3 data, when the then following single attachment unit is taken as L, then whether or not it is possible to attach the then following single attachment unit (L length) is judged by whether or not the following equation (2) is satisfied or not.

$$L3-L \geq 0 \quad \text{Equation (2)}$$

Subsequently, for each attachment of a single attachment unit of the ACF 8, the remaining length of the ACF at that point in time is updated by L3, and whether or not it is possible to attach the next single attachment unit is judged by whether or not the following equation (2) is satisfied or not.

Consequently, when the joint sensor 11 detects the joint 18, the control unit executes an attachment of the ACF 8 for the number of single attachment unit portions possible to be attached up to the joint 18, and when the attachments for this number of single attachment unit portions are finished, the operation of the device is stopped.

Figure 6H:
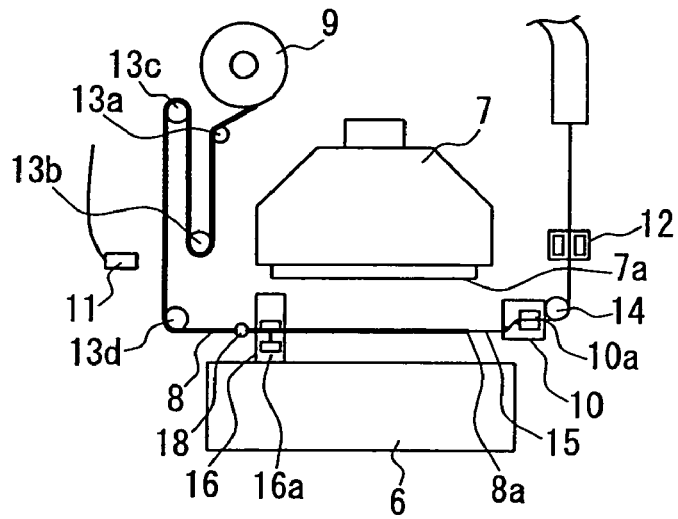
Figure 6I:
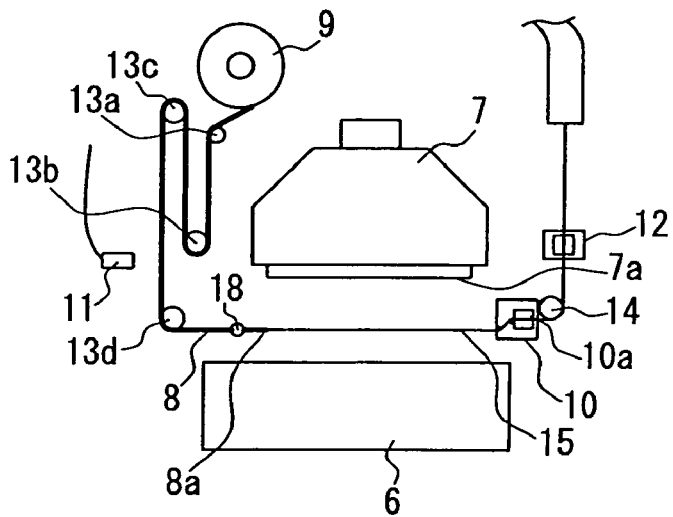

FIG. 6H shows a step of cutting a final portion of an ACF 4 before the stopping of operation. After this, as in the step of FIG. 5E, when the cutter 16 is withdrawn and a substrate is supplied, the pressure applying surface 7a of the head 7 is heated to a predetermined temperature, and presses the substrate 17 with the ACF 8 in between, and the last single attachment unit of the ACF 8 is attached to the substrate 17. After this, as shown in FIG. 6I, after the head 7 moves up, and the release sheet 15 is peeled off by a peeling off operation of the feed chuck 10, the device is temporarily stopped in the state shown in FIG. 6I. After this, the ACF 8 is fed manually so that the joint 18 is moved in the conveying direction beyond the position of the cutter 16, and after the ACF 8 is cut leaving the release sheet 15, the ACF 8 is peeled off from the release sheet 15 up to the cutting position. In this way, the cutting position becomes the new leading edge of the ACF 8. Through these tasks, the device is put into an initial state such as that shown in FIG. 4A.

The joint sensor 11 is provided in this embodiment, so that the joint sensor 11 detects the joint 18 and reliably stops the movement of the feed chuck 10 regardless of the size of the single attachment unit or the type of reel. Therefore, it is possible to reliably prevent ACF 8 containing a joint from being attached to the substrate 17.

Furthermore, although manual tasks are necessary after the movement of the feed chuck 10 is stopped and until the setup of an initial state, the same reel can be used in succession, and therefore the number of reel replacements is reduced, and the burden of the task of reel replacement is reduced. In addition to this, the ACF 8 can be used effectively up to the joint 18, so that resource losses can be suppressed.

It should be noted that this embodiment, as with Embodiment 1, can also be applied as a device that detects an end mark. In this case too, the ACF up to the end mark is used continuously in attachment operations until the next single attachment unit cannot be ensured, and attachment operations are stopped at the point when the next single attachment unit cannot be ensured.

Furthermore, this embodiment was explained with an example in which a reel wound with ACFs connected by a joint is used, but in a configuration such as that mentioned above in which an end mark is detected, it also can be applied to a reel wound with a single ACF without a joint. In this case too it is possible to reliably prevent ACF containing an end mark from being attached to a substrate, and the ACF up to the end mark can be used effectively.

EMBODIMENT 2

Embodiment 1 was explained with an example in which it is judged whether or not the next single attachment unit can be ensured, but there is no limitation to this, and it is also possible to judge whether or not a length totaling the attachment lengths enough for all the ACF attachments on the next substrate can be ensured.

This embodiment will be explained with reference to FIG. 7. FIG. 7 shows a top view of an example substrate. A liquid crystal panel 17*a* is mounted on the substrate 17. The reference number 50 refers to the locations in which ICs for running the liquid crystal panel 17*a* are installed, that is, the locations in which ACFs are attached. In the example in FIG. 7, different single attachment units of ACF are to be attached in a total of three locations.

In this embodiment, when the joint 18 of the ACF is detected, it is judged whether or not enough ACF for the attachments of the current substrate 17 to which ACF is being attached can be ensured in the ACF up to the joint 18. When a length of enough ACF for the attachments of the current substrate 17 to which ACF is being attached is ensured, attachments continue. A judgment then is made of whether or not a length (in the case of FIG. 7, a length corresponding to the three locations) of enough ACF for the attachments for the next substrate 17 that has been transported in can be ensured in the ACF up to the joint 18. When it is judged that a length of enough ACF for the attachments of the next substrate 17 can be ensured, attachments continue.

Equation (1) and (2) may be applied for these judgments with L taken as a length totaling the attachments of ACF for the next substrate 17. In this case, at the point when a length that is enough for the ACF required for the next substrate cannot be ensured, attachment operations are stopped. In this way, although inferior in terms of the effective use of ACF compared to when a judgment is made for each single attachment unit, it is possible to avoid stopping the operation of the device during attachments to the substrate 17. By doing this, it is possible to prevent deterioration of the ACF's adhesive caused by leaving the substrate 17 during attachments to the substrate 17. Furthermore, as no substrate 17 remains in the ACF attaching device, manual tasks after the device stops become easier, and operability is improved.

EMBODIMENT 3

FIG. 8 is a process drawing of an ACF attaching device according to Embodiment 3. A step of cutting a final portion of the ACF 8 is carried out in this embodiment as in FIG. 6H, and the steps until the attaching of the final portion of the ACF 8 to the substrate are the same as in Embodiment 1. In this embodiment, an automatic skipping (forwarding through) of the joint 18 is performed when the joint 18 is detected.

Figure 8A:
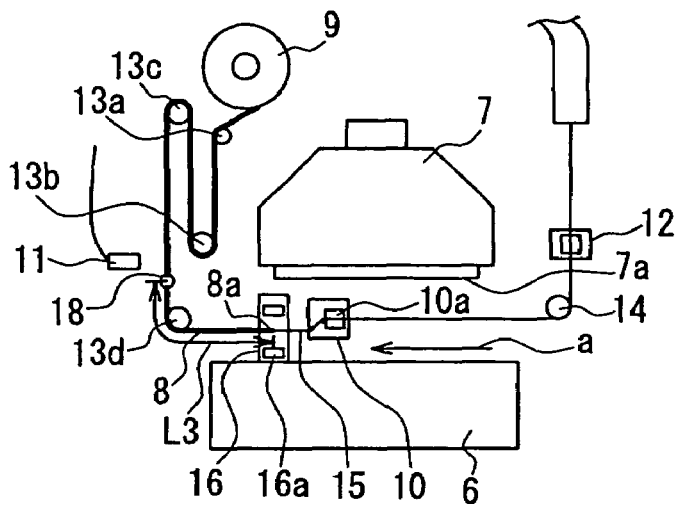
FIG. 8 is a process drawing of an ACF attaching device according to Embodiment 3 of the present invention.
Figure 8B:
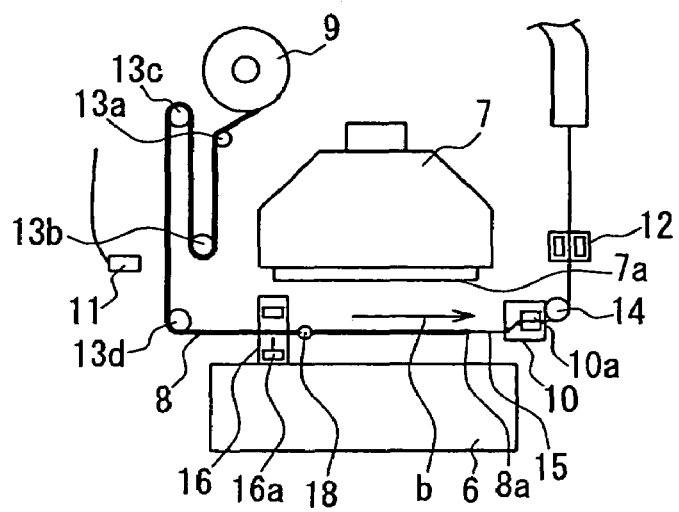

FIG. 8A shows a state in which a sheet of a final portion of a single attachment unit of the ACF 8 has been attached after the joint 18 was detected by the joint sensor 11. With the chuck portion 10*a* in an open state, the feed chuck 10 moves in the direction of the arrow a, then stops before the cutter 16. The chuck portion 10*a* clamps and holds the release sheet 15. For convenience of explanation, the joint sensor 11 and the joint 18 are nearby in FIG. 8A, but FIG. 8A shows the state in which, after the joint sensor 11 detects the joint 18, the attachment of the number of single attachment units of the ACF 8 that can be attached is completed. In FIG. 8B, a movement of the feed chuck 10 in the direction of the arrow b is carried out for the feeding operation, and the joint 18 of the ACF 8 moves to the conveying side of the cutter 16.

Here, when the length of the ACF 8 from the joint 18 until the cutting position is taken as L3 as in FIG. 8A, L3 is the length remaining after subtracting the length of the first ACF 8 after the detection of the joint from L1 (FIG. 6G), and after further subtracting the length of the number of single attachment units that can be attached. The method for calculating this remaining length is the same as in Embodiment 1.

Consequently, when the feed chuck 10 is moved in the direction of arrow b by a distance greater than the length of L3, the joint 18 moves toward the discharge side of the release sheet 15 from the cutting position. It is possible for this L3 amount of forwarding through to be calculated by the control unit as explained in Embodiment 1.

Figure 8C:
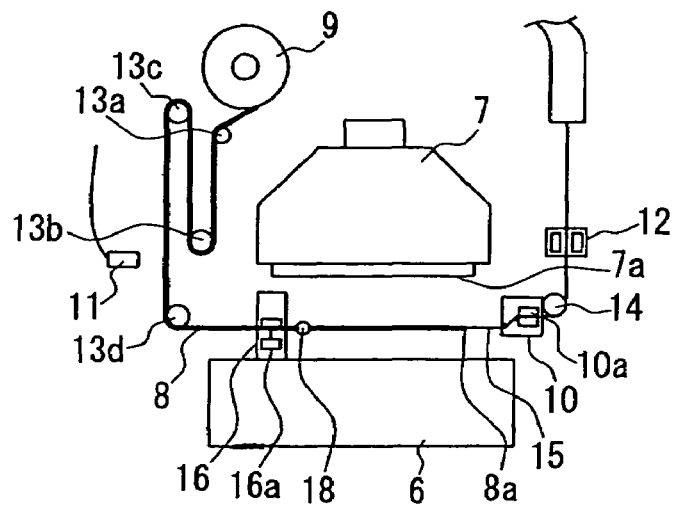

FIG. 8C shows a cutting step. After the skip is completed, the ACF 8 is cut leaving the release sheet 15 intact. After the cutting, the operation of the device is stopped, and the ACF 8 is peeled off manually from the release sheet 15 up to the cutting position, returning the device to an initial state.

The above explanation was of an operation when the joint 18 is detected, but it is possible for the control unit to judge whether or not the item detected is either the joint 18 or the end mark 31. When it is judged that the joint 18 is detected, an operation of skipping the joint 18 is performed such as that described above. However, when the control unit judges that an end mark 31 has been detected, the ACF up to the end mark 31 is used as described in Embodiment 1, and the control unit stops the operation of the device when the possible limit of attachments that can be attached are finished. In other words, a skipping of the end mark 31 is not performed in this case.

In this embodiment, as in Embodiment 1, the ACF 8 can be used effectively up to the joint, thus making it possible to suppress resource loss. In addition to this, the task of skipping the joint 18 is automated, and therefore the manual tasks required until the setup of an initial state can be reduced.

EMBODIMENT 4

Figure 9A:
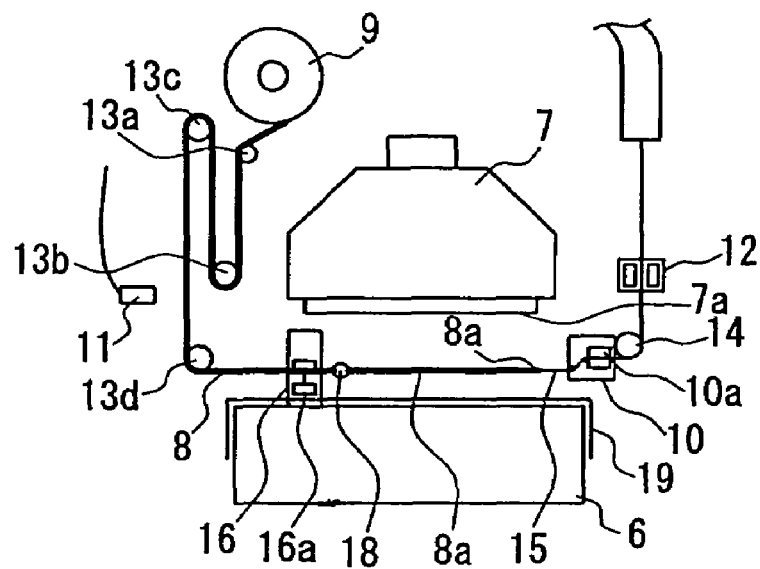
FIG. 9 is a process drawing of an ACF attaching device according to Embodiment 4 of the present invention.

FIGS. 9 and 10 are process drawings of an ACF attaching device according to Embodiment 4. The steps in this embodiment are the same as Embodiment 3 until the cutting step shown in FIG. 8C of Embodiment 3. In Embodiment 3, the task of peeling off the release sheet 15 from the ACF 8 to set up an initial state is performed manually, but in Embodiment 4, this peeling off task is also performed automatically. FIG. 9A shows the state after the joint has been skipped. In FIG. 9A, a discarding stage 19 has moved above the stage 6.

Figure 11:
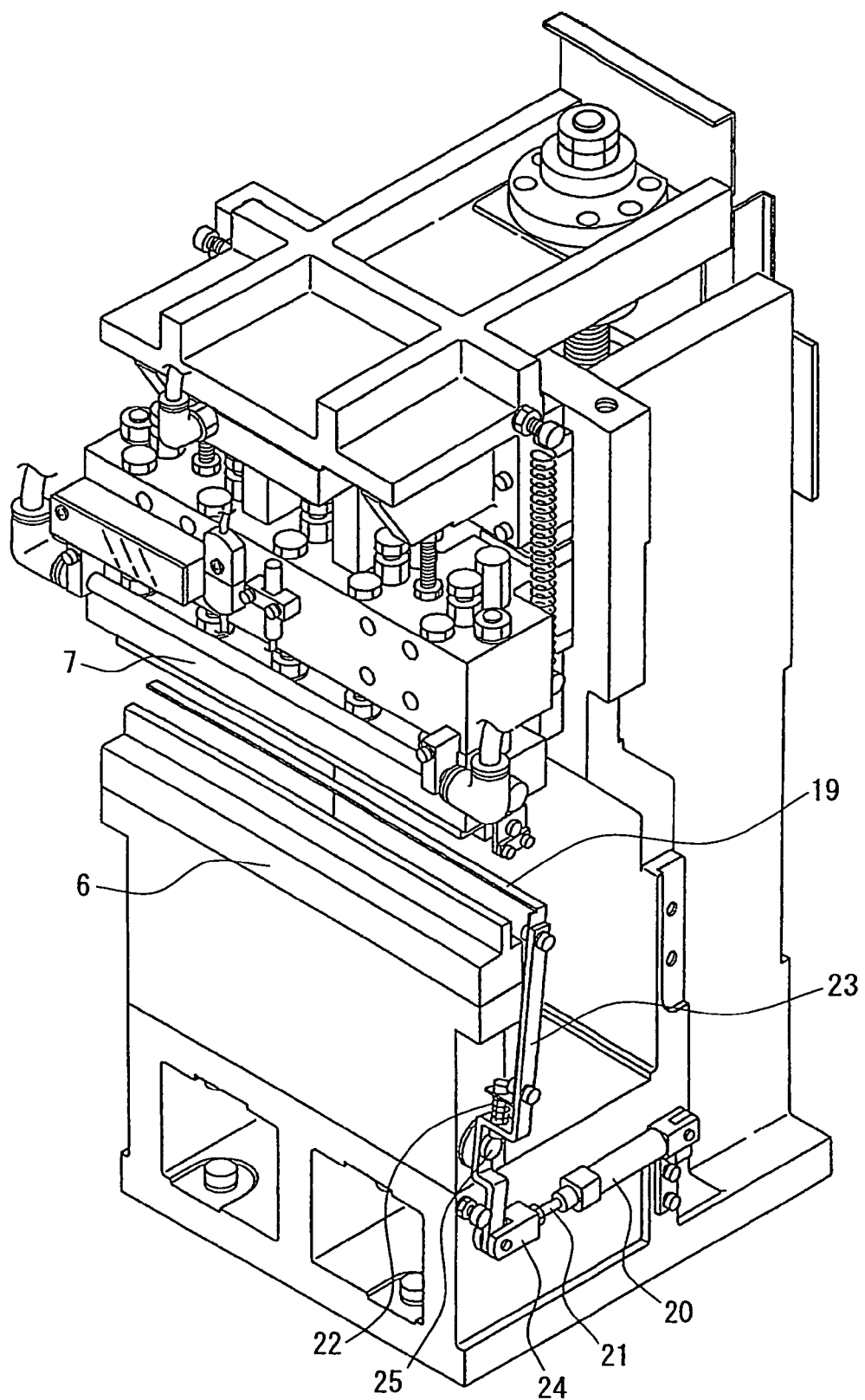
FIG. 11 is an oblique view of the main parts of an ACF attaching device according to an embodiment of the present invention.
Figure 12A:
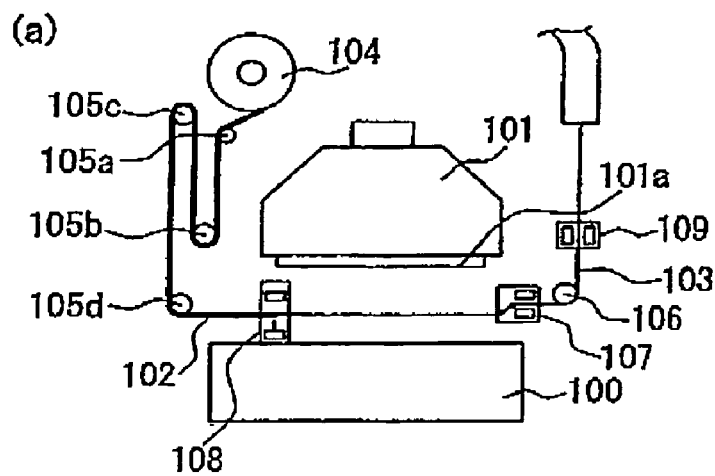
FIG. 12 is a process drawing of an example of a conventional ACF attaching device.
Figure 12B:
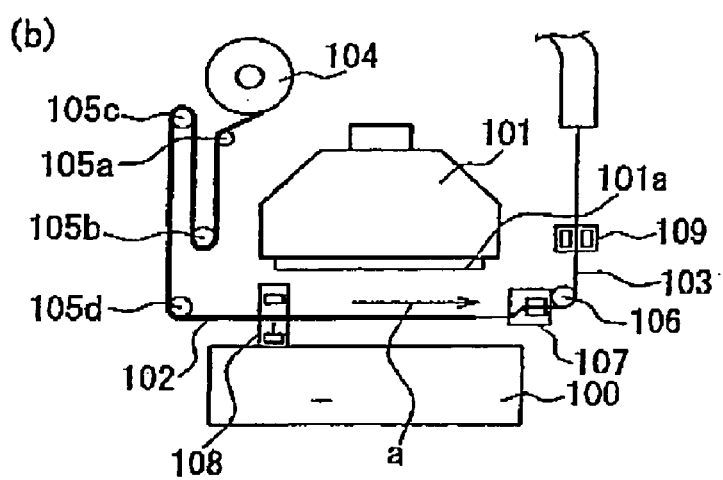
Figure 12C:
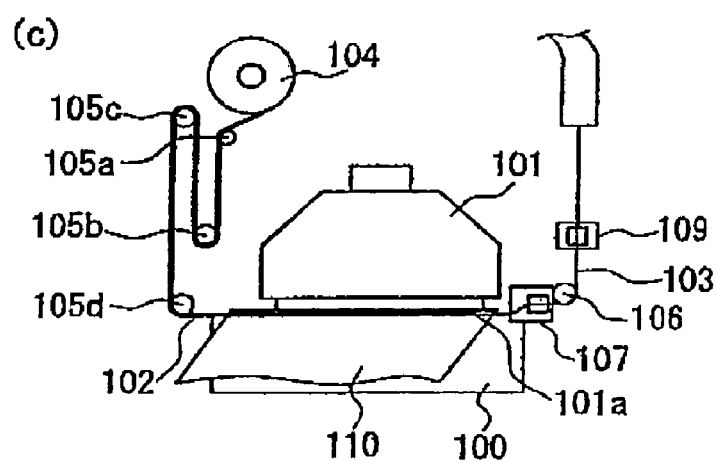

Here, the basic operation of the discarding stage 19 is explained with reference to FIG. 11. FIG. 11 is an enlarged view of the main parts of the ACF attaching device shown in FIG. 2. The discarding stage 19 is attached at an arm 23, which is a supporter. The arm 23 is attached via a shaft 21 and a coupler 24. The shaft 21 is extendable-retractable by a cylinder 20, which is a movement enabling means.

With the extension-retraction of the shaft 21 by the cylinder 20, the discarding stage 19 is rotatable around a rotation axis 25. In this way, the discarding stage 19 can be moved above the stage 6, and can be withdrawn to a position that does not interfere with the head 7 when the head 7 is pressing.

Furthermore, in the case of the discarding stage 19 being positioned above the stage 6, when the head 7 descends and abuts the discarding stage 19, the arm 23 also descends along with the descending of the head 7, causing a spring 22 to compress along with this, and finally the head 7 presses on the discarding stage 19.

With this configuration, setting up the discarding stage 19 above the stage 6, and withdrawing the discarding stage 19 from above the stage 6 can be performed speedily by an operation of rotating the discarding stage 19 with the arm 23. Moreover, despite being only a simple operation, the discarding stage 19 can be mounted reliably above the stage 6.

Figure 9B:
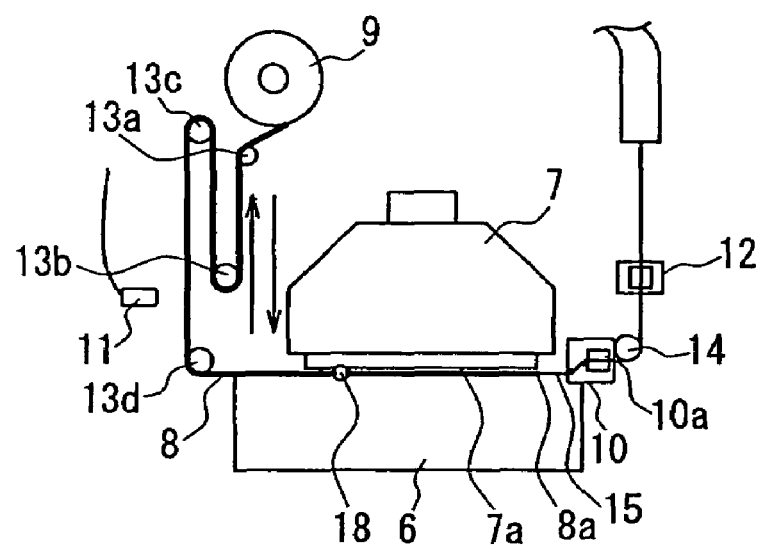

When the head 7 descends as in FIG. 9B, the discarding stage 19 is pressed by the head 7 as described above, and the ACF 8 between the head 7 and the discarding stage 19 becomes attached to the discarding stage 19.

Figure 10A:
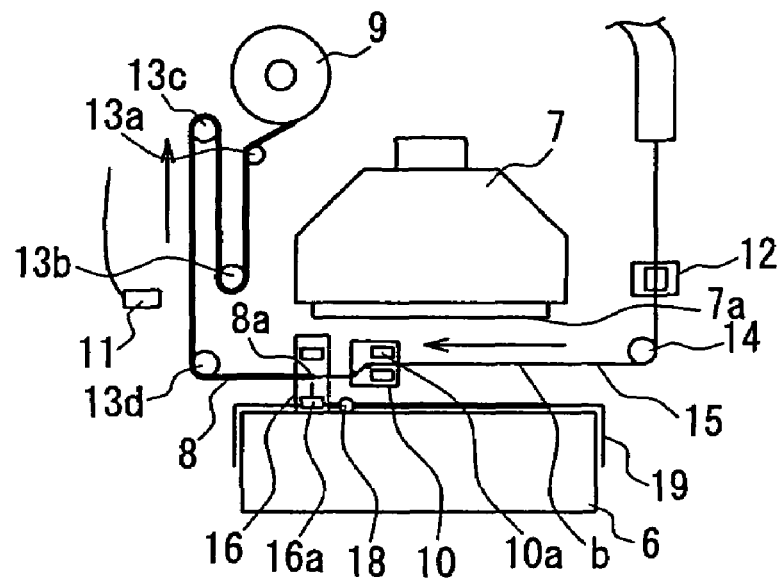
FIG. 10 is a process drawing of an ACF attaching device according to Embodiment 4 of the present invention.
Figure 10B:
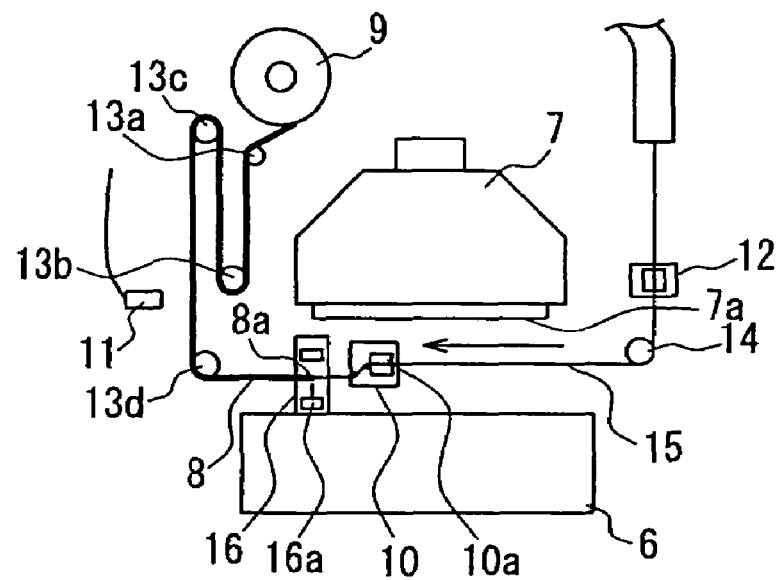

In FIG. 10A, the head 7 has moved up, and in this state the feed chuck 10 is moved in the direction of the arrow b with the chuck portion 10a in an open state, thus peeling off the release sheet 15 from the ACF 8. FIG. 10A shows the state after the release sheet 15 has been peeled off. In FIG. 10B, the discarding stage 19 is withdrawn, and this state is an initial state for the operation in which the next sheet of ACF is attached. After this, the automated attaching steps can continue again as described above by repeating the above-described steps.

When a predetermined number of the ACF 8 sheets are attached to the discarding stage 19, the attached ACF 8 sheets are peeled off from the discarding stage 19 by an operator, and the discarding stage 19 is washed to remove adhesiveness. Furthermore, the task of peeling off the ACF 8 can be made easier by attaching a release sheet to the discarding stage 19 in advance and attaching the ACF 8 onto that.

Furthermore, the control unit judges whether or not it is necessary to peel off the discarded ACF 8 or release sheet, and notifies the operator via an operation panel (not shown in figure) or by a signal tower 52 shown in FIG. 1. As for the judgment of whether or not peeling off is necessary, it can be judged that peeling off is necessary when, for example, the number of discarded films has been counted, and a preset, predetermined number of discarded films has been reached.

Furthermore, the control unit also may comprehensively judge and notify concerning the thickness of the discarded ACF 8, the viscosity detected by a viscosity sensor, and data of the number of discarded ACF 8. The operator is notified of the timing for the task of peeling off the ACF 8 or release sheet from the discarding stage 19, and therefore the equipment is never left with these not peeled off. Consequently, this prevents quality-related problems of the head applying discarding pressure when in a state that is not within allowable conditions, and because the task of peeling off is performed speedily when peeling off is necessary, production efficiency is improved.

As with Embodiment 3, the skipping task is automated in this embodiment. In addition to this, by avoiding the task of peeling off the discarded ACF 8 on the discarding stage 19, or peeling off the release sheet that is attached in advance to the discarding stage 19, manual tasks performed after detection of a joint are eliminated. That is, in this embodiment, after detection of a joint, the serial operations of skipping the joint and peeling off the release sheet from the ACF 8 of the skipped portion are automated, thus improving the operating ratio compared to the above-described embodiments.

Here the reasons for discarding the skipped portions of the ACF 8 are to avoid a predetermined length containing a skipped portion longer than a single attachment unit having pressure applied by the head 7 and becoming attached, even if the portion of ACF 8 containing a joint is skipped, and, by discarding, to avoid clamp-holding of the skipped portion by the feed chuck 10 and the sheet lock 12. If the skipped portion is clamp-held by the feed chuck 10 or the sheet lock 12, there is the possibility of the ACF 8 becoming attached to the feed chuck 10 or the sheet lock 12, and there is the possibility that correct feeding cannot be performed when ACF 8 becomes attached.

It should be noted that Embodiments 1 to 4 were explained with a configuration in which the joint sensor 11 is arranged to some extent removed from the stage 6. The reasons for such a configuration are to eliminate interference between the stage 6 and the head 7, and because arranging the detection position of the joint sensor 11 on the ACF 8 side (an arrangement in which detecting a joint is easy) is simpler.

If possible in terms of layout, the joint sensor 11 may also be arranged near the cutter 16. In this case, a setup is also possible in which, at the point when the joint 18 is detected, a length that can ensure a length of a single attachment unit does not remain in the ACF 8. With this configuration, the attaching step becomes unnecessary after the joint 18 is detected, and the process can continue and move on to the step of skipping.

Furthermore, these embodiments were described with an example in which the ACF is supplied from a reel onto which it is wound, but there is no limitation to this as long as the ACF is stored so that it can be fed, and ACF that is stored in other forms may be supplied.

Furthermore, these embodiments were described with the example of ACF, but there is no limitation to this, and the same effect may be obtained with an adhesive sheet with attached release sheet. Furthermore, the target object for mounting was described with the example of a liquid crystal panel, but there is no limitation to this, and the same effect may be obtained with other display panels such as plasma displays.

INDUSTRIAL APPLICABILITY

As described above, the present invention is provided with a joint detector, and therefore, regardless of the length of a single attachment of adhesive sheet or the type of reel, the detector detects a joint and reliably stops the movement of the feeder. For this reason, adhesive sheet containing a joint can be reliably prevented from attaching to a target object for attachment.

Furthermore, the adhesive sheet can be used effectively up to the joint, thus suppressing resource loss. Further still, an operating ratio can be improved by automating the manual tasks in the period after the detection of a joint until the setup of an initial state. For this reason, the present invention is useful for adhesive sheet attaching devices and component mounting devices in which an adhesive sheet for fixing mounted components is attached to display panels such as liquid crystal panels and plasma displays.

The invention claimed is:

1. An adhesive sheet attaching method that attaches an adhesive sheet with an attached release sheet supplied continuously in a longitudinal direction to a target object, and discharges a release sheet peeled off from the adhesive sheet, the method comprising:
   supplying, as the adhesive sheet, an adhesive sheet that is provided with a connecting portion in which ends of adhesive sheets that are continuous in the longitudinal direction are joined;
   feeding the adhesive sheet by moving the release sheet peeled off from the adhesive sheet with a feeder;
   cutting a length of the fed adhesive sheet that is necessary for attachment with a cutter, and attaching the cut adhesive sheet to the target object with an attacher;
   when the connecting portion is detected by a detector, after an adhesive sheet of an attachable length up to the connecting portion has been attached,
   causing the feeder to move until a position of the connecting portion is on the discharge side of the release sheet with respect to a cutting position of the cutter,
   causing the adhesive sheet to be cut by the cutter, and attaching the adhesive sheet to a discarding stage, and resuming an operation by the attacher.

2. An adhesive sheet attaching device that attaches an adhesive sheet with an attached release sheet supplied continuously in a longitudinal direction to a target object, and discharges a release sheet peeled off from the adhesive sheet,
   wherein the adhesive sheet is provided with at least one of a connecting portion in which ends of adhesive sheets that are continuous in the longitudinal direction are joined, and an end portion that indicates an end position of the supply in the longitudinal direction,
   wherein the adhesive sheet attaching device comprises:
      a feeder for moving while holding a release sheet peeled off from the adhesive sheet, and feeding the adhesive sheet onto the target object;
      a cutter for cutting a length of the fed adhesive sheet that is required for attachment;
      an attacher for attaching the cut adhesive sheet to the target object;
      a detector for detecting the connecting portion or the end portion; and
      a controller for controlling at least an operation of the feeder, the cutter and the attacher; and
   wherein the controller, when the detector detects the connecting portion or the end portion, determines a length from an end face on a discharge side of the release sheet up to the connecting portion or the end portion, and continues an attachment operation of an adhesive sheet of an attachable length from the end face on the discharge side of the release sheet up to the connecting portion or the end portion and stops the operation of the feeder and the attacher after the adhesive sheet of the attachable length from the end face on the discharge side of the release sheet up to the connecting portion or the end portion has been attached, and
   wherein the adhesive sheet attaching device further comprises a stage onto which the target object is mounted, wherein the attacher comprises a press that presses the target object mounted on the stage with the adhesive sheet fed onto the target object in between,
   wherein the adhesive sheet attaching device further comprises a discarding stage that is capable of moving over the stage and withdrawing from the stage,
   and wherein the controller, after causing the feeder to move until a position of the connecting portion is on the discharge side of the release sheet with respect to a cutting position of the cutter,
   causes the adhesive sheet to be cut by the cutter, the discarding stage to move over the stage, and the adhesive sheet to be attached to the discarding stage by the press.

3. The adhesive sheet attaching device according to claim 2, wherein a release sheet is attached to the discarding stage, and the adhesive sheet is attached to the release sheet.

4. The adhesive sheet attaching device according to claim 2, comprising a notification means for notifying when a predetermined number of the adhesive sheets is attached to the discarding stage.

5. The adhesive sheet attaching device according to claim 2, wherein the discarding stage is attached to a supporter that is rotatable by a movement enabling means, and can be moved over the stage and withdrawn from the stage with the rotation of the supporter.

* * * * *